June 18, 1968 R. C. VAN HORN 3,389,131
METHOD OF MAKING ALKALI METAL CASEINATE COMPRISING
DRY MIXING CASEIN AND AN ALKALI METAL COMPOUND
AND DIRECTING A JET OF STEAM TO THE
MIXTURE TO CAUSE REACTION
Filed Feb. 21, 1967
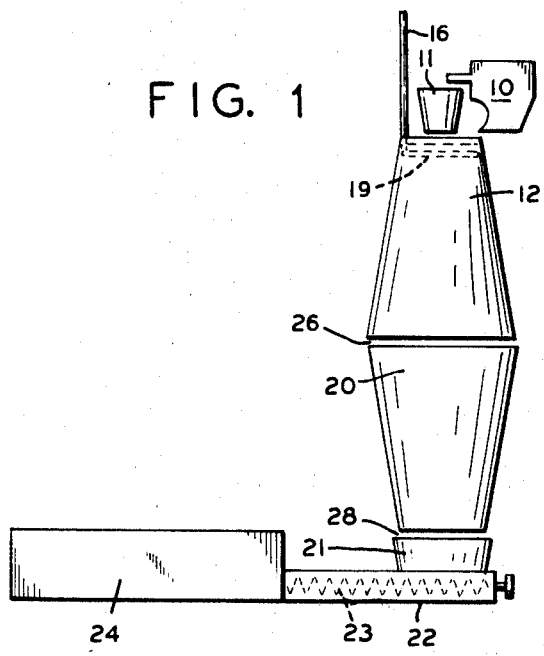
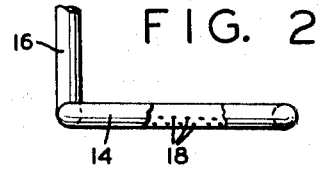
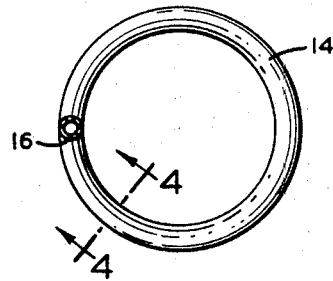
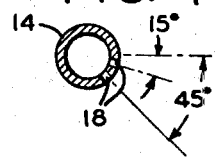
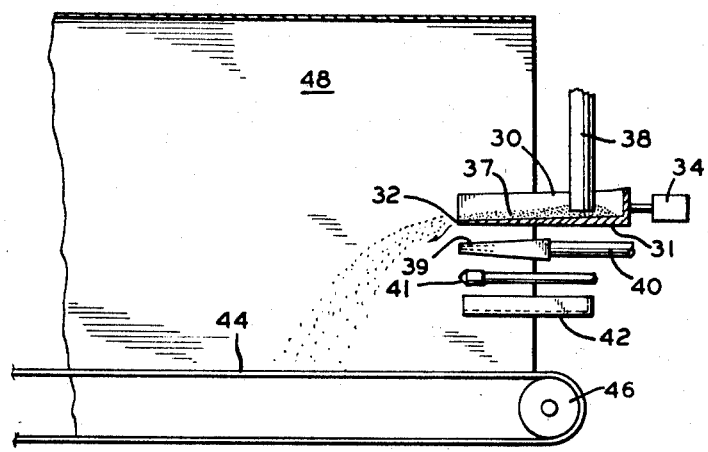
INVENTOR.
RALPH C. VAN HORN
BY
JOHN P. CHANDLER
HIS ATTORNEY.

United States Patent Office 3,389,131
Patented June 18, 1968

3,389,131
METHOD OF MAKING ALKALI METAL CASEIN-ATE COMPRISING DRY MIXING CASEIN AND AN ALKALI METAL COMPOUND AND DIRECT-ING A JET OF STEAM TO THE MIXTURE TO CAUSE REACTION
Ralph C. Van Horn, Bedford, Quebec, Canada, assignor to Champlain Industries (1962) Ltd., Quebec, Quebec, Canada
Continuation-in-part of application Ser. No. 333,969, Dec. 27, 1963. This application Feb. 21, 1967, Ser. No. 629,343
5 Claims. (Cl. 260—119)

ABSTRACT OF THE DISCLOSURE

Method of making alkali metal caseinate comprising dry mixing casein and an alkali metal compound capable of producing a high concentration of hydroxyl ions when subjected to a jet of steam.

---

The present application constitutes a continuation-in-part of my U.S. applications Ser. No. 333,969, filed Dec. 27, 1963, and 418,604, filed Dec. 16, 1964, both now abandoned.

This invention relates to an improved method of treating materials which are insoluble in water or substantially so, and relates more particularly to an improved process of producing alkali metal caseinates having a desired pH, particle size and solubility.

The invention also relates to an improved method of chemically reacting dry materials such as caseinates and similar products.

An important object of the present invention is the provision of a novel continuous process for the production of sodium caseinate having a clean odor and a bland flavor wherein the pH and the particle size of the final product can be accurately controlled and the product will have a high degree of dispersibility and solubility in water and the bulk density of the product can also be accurately controlled.

Ordinary casein is insoluble in water and to increase its uses, particularly in foods, it is necessary to make it soluble in water by reacting it with small quantities of an alkali metal compound wherein an alkali metal is joined with some non-metallic element or radical like a hydroxide, wherein the alkali metal compound has a pH of about 11 or 12 and produces, when reacted with the protein in the presence of steam, a high concentration of hydroxyl ions which hydrolyze and soubilize the protein. Various carbonates, soda ash and caustic soda are particularly suited for the purpose. Casein is slightly acidic while most of these latter materials, which are reacted with the casein to give it a desired measure of solubility and dispersibility, are basically alkalis. The term alkali metal compounds as used herein is deemed to include carbonates and other salts as well as the hydroxides.

The usual method of preparing sodium caseinate consists in reacting casein with aqueous solutions of an alkali salt such as sodium carbonate or a hydroxide, such as sodium hydroxide, in a tank to produce a solution of sodium caseinate. This is a batch operation. It requires large quantities of water to get the casein into a solution that will enable the reaction to take place and in a form that will make possible its subsequent spray or roller drying. Water representing about 80% of the solution must then be removed by spray or roller drying in order to make a commercially acceptable product. Also, in both spray drying and roller drying the particles come in a wide range of sizes including a large proportion of exceedingly fine particles making the product excessively dusty.

In a currently used process disclosed in Spiess Patent No. 3,042,526 two airborne jets are directed at each other in a reaction chamber, one carrying the powdered casein and the other a hot calcium carbonate solution and the reaction occurs in midair. Portions of the materials react and other portions do not and those that do react do not have a uniform pH. This requires batch blending after processing in order to get a uniform product and the process is therefore not a continuous one in the sense that my process is.

Dahle in Patent No. 1,048,949 seeks to produce a soluble "albumin" by reacting sodium chloride and casein with hot water and the process is apparently based on his belief that this high heat will produce negative hydroxyl ions. These ions are very weak, however, as compared with the alkali metal compounds used herein, which produce strong negative ions with a pH in the range of about 10 to 12. The product produced by Dahle is brown and caked and is relatively insoluble in water. The pH of a 5% solution in his process is about 4.5 while the pH of normal, untreated casein is 4.5 to 4.6 which established that negative hydroxyl ions of water alone as used in the Dahle process are very weak and do not hydrolyze the casein. My product has a pH of about 6.8 to 7 and the process is at least 100 times more effective than Dahle's.

Another object of the invention is to provide a process for producing sodium, potassium or other alkali metal caseinates wherein the alkali metal particles are completely dispersed throughout the mass before any chemical reaction occurs.

In accordance with the present invention, the dried powdered casein is intimately mixed with a minor percentage of the alkali metal salt or base such as soda ash. Dry casein as that term is used herein and in the appended claims is deemed to have about 8% to 10% of moisture. The quantity of the soda ash must be carefully controlled since if the concentration is too small there is insufficient chemical reaction and if too great the product will not be acceptable because of too high a pH which would produce an objectionable taste and flavor. No chemical reaction occurs between the two dry components but when the thoroughly mixed mass is introduced into a reaction chamber in the presence of steam an immediate reaction occurs.

In the preparation of sodium caseinate in accordance with the present invention, there is added to the powdered casein (from 50 to 100 mesh) from about 2% to about 6% of an alkali metal salt or hydroxide such as sodium carbonate, bicarbonate or hydroxide, and the mixture is thoroughly dry blended. When steam is introduced into the chamber, the steam dissolves the alkali and the resultant solution reacts with the casein to form sodium caseinate. The heat that is liberated comes from the heat of solution of the alkali.

In the foregoing process, solubility is achieved by the step of intimately mixing the alkali metal compound with the casein and subjecting it to the action of steam which produces a high concentration of hydroxyl ions. The uniform pH of the product is achieved by intimately mixing the alkali with the casein prior to any reaction followed by high temperature wetting.

A further object of the invention is to provide an improved apparatus for performing the method of the present invention which is simple and inexpensive and has large output capacity. The method of feeding the casein and the other material is simplified since they are premixed and if the feed slows up it makes no difference since the additional moisture in the final product causes no marked difficulty as it can be run through a dryer a second time if needed. The intimately mixed powder falls into a reaction chamber where the particles are promptly bombarded by fine jets of steam moving with the powder. The reaction takes place immediately and although there is considerable turbulence in the reaction zone due in part to the heat given off by the reaction, the reaction products move rapidly through the zone into a dryer and the apparatus has large production capacity.

The particle size of both the casein and the alkali is very important. In every case, the size of the particles of the alkali should not be larger than the casein particles and, in most instances, they should be smaller. Good results are achieved if the alkali has a particle size of between 50 and 100 mesh and the casein 40 and 90 mesh and if the particle size of the alkali is nearer the 50 mesh size the casein should be proportionately larger. If larger particles are desired in the finished product, the size of the casein particles should be relatively larger.

In addition to the manufacture of agglomerated types of caseinate for use in the food and pharmaceutical fields, the present invention makes possible the presolubilizing of commercial grade casein with an attendant wide range of applications.

In solubilizing commercial grades of casein the same procedure and equipment as that described for making caseinate is followed and used, the only difference being that of the grade of casein that is converted. Because of the normally high cost of manufacturing conventional spray and roller dried caseinate as well as the casein metallic salts compounds covered in U.S. Patents 2,005,730, 2,103,153, 2,108,582 et al., not to mention their limitations due to either undesirable physical or chemical properties, there has up to now been only a limited market for presolubilized casein in commercial and industrial applications. The present invention has changed the situation to the extent that it enables the manufacture of pre-solubilized casein without increasing its cost to a point where its use is economically unfeasible. Because of its faster and more dependable action in breaking down, a pre-solubilized casein can be used as a substitute for the insoluble casein that is incorporated in many dry powder products for its adhesive, binding or emulsifying properties.

In the drawings:

FIG. 1 is a semi-diagrammatic view of the apparatus for carrying out the continuous process of the present invention;

FIG. 2 is a side elevation, partially broken away, of the means for feeding steam to the reaction chamber;

FIG. 3 is a top plan view thereof;

FIG. 4 is a section taken on line 4—4 of FIG. 3;

FIG. 5 is a diagrammatic view showing an alternate type of feed for the mixed powder.

The intimate mixture of casein and alkali metal salt is fed to the system at 10 and into a funnel 11 located above a cylindrical reaction chamber 12 having a smaller diameter at its upper end and within the open upper end a ring 14 of tubular material is secured. This ring, through the center of which the admixture falls, has a connection 16 with a source of steam (not shown) has a plurality of nozzle openings 18 which are inclined downwardly and inwardly toward the center of the ring. These nozzle openings are preferably disposed at angles of from 15° to 45° from the horizontal plane of the ring. In this fashion, the fine particles of water in the vapor phase collide with the solid particles of the mixture thoroughly wetting them, producing the desired chemical reaction and causing a high level of turbulence.

The powdered mixture thus falls into the central area and is wetted by the jets of steam issuing through openings 18. The steam dissolves the alkali metal material which then reacts with the casein to form the sodium caseinate. The reaction, of course, is facilitated by the heat from the steam. The reaction is further facilitated by the heat of solution of the alkali metal salt. Heating coil 19 may supply more heat if necessary.

Below the reaction chamber there is a funnel shaped chamber 20 with a reverse taper from that of reaction chamber 12 and below this chamber is a smaller funnel 21 which directs the powder to an elongated housing 22 having a screw conveyor 23 which conveys the powder to a cylindrical dryer indicated at 24. It may also be conveyed to a dryer by means of a rubber belt shown in FIG. 5.

The steam should carry sufficient moisture to increase the moisture content of the casein from its usual 8% or thereabouts to approximately 10% or 12%. Part of this added moisture of 2% to about 4% is quickly dissipated due to the heat produced by the reaction. Of the remainder, some passes out through opening 26, between the reaction chamber 12 and funnel, and also between the latter and funnel 21. These openings are preferably variable to suit different conditions.

In the modified apparatus shown in FIG. 5, a vibrating feed assembly for the dry, pre-mixed material comprises a chute or trough 30 with a flat bottom wall 31 and a straight spill-over edge 32. The chute is inclined slightly downwardly and is vibrated by a conventional horizontal electric vibrator shown schematically at 34 and imparting impulses parallel with the direction of feed. The dry mixture of casein and alkali material is continuously fed from an overhead hopper through a vertical feed pipe 38 whose lower discharge end is positioned in an adjusted, fixed relation to the lower wall of the chute, which latter limits the amount of powder that can fall by gravity onto the chute. The dry mixture on the latter is indicated at 37. The amount which falls in a sheet-like stream over the forward edge is controlled by the intensity of the vibrating impulses. As the material falls into this reaction zone, it encounters a jet of steam which issues from a nozzle 39 having a horizontal, rectangular discharge port of about the same width as the spill-over edge and of a depth of the order of ¼-inch. The steam feed may have a suitable feed control valve and a condensate exhaust. It may also be equipped with a steam temperature gauge.

The steam, which is supplied from a boiler (not shown) through a feed pipe 40, is under only moderate pressure so it is essentially wet and it thoroughly wets each and every particle of the mixed powder, thus causing an immediate reaction which produces the sodium or other caseinate. If atomized water is desired in addition to the steam, it may be fed to the free-falling sheet of powder by a nozzle 41. A pan 42 is positioned just inside the edge of the feed trough to catch any larger clumps of the wetted material which sometimes form and which are too large for treatment by any of the usual drying processes.

As the wetted, reacted material moves forward on the conveyor belt, it has a "feel" that determines whether it is too wet or too dry. At this point an atomized water spray may be directed at the underside of the falling, partially reacted material 41. A little too much moisture is preferable to too little because the excess moisture assures a more complete reaction of the ingredients.

The wetted, reacted material falls on an endless conveyor belt 44, supported by rollers 46, in a tunnel 48 where some of the drying occurs due to the heat produced by the reaction. The length of the conveyor belt will vary according to the speed at which the belt is moving. In most cases, a belt with an upper course about 10 to 20 feet in length gives the best results and at the end of the belt the powder is delivered to a dryer (not shown) which removes the additional small percentage of water necessary to produce a commercially acceptable product. A low steam pressure causes the reacted particles to fall downwardly at an angle of about 45°. The reaction continues as the particles move forwardly on the belt and by the time they reach the end of the belt they are thoroughly wetted and generally have a moisture concentration of about 12% compared to about 6-8% desired in the finished dry mixture.

Any suitable dryer may be used provided it is capable of reducing the moisture to between 6 and 8%.

While my process and the means for carrying the same into effect as well as the machine of the present invention have been described above, my invention is not limited to the specific examples recited hereinabove, but the protection I desire to obtain by Letters Patent is set forth in the appended claims.

The embodiments of the invention in which an exclusive property or privilege is claimed are defined as follows:

1. The method of preparing an alkali metal caseinate which consists in dry blending into an intimate mixture casein having a particle size of from 50 to 100 mesh with from about 2% to about 6% by weight of an alkali metal compound having a pH of between 10 and 12, when mixed with water, the particle size of the alkali metal compound being, in general, not larger than the particle size of the casein, and feeding the mixture into a reaction zone while directing a jet of steam at the mixture to dissolve the alkali compound and produce a reaction between the casein and said alkali compound, and then drying the product.

2. The method defined in claim 1 wherein the casein has a moisture content of from 8 to about 10%.

3. The method defined in claim 1 wherein the alkali metal compound is sodium carbonate.

4. The method defined in claim 1 wherein the alkali metal compound is sodium bicarbonate.

5. The method defined in claim 1 wherein the alkali metal compound is sodium hydroxide.

References Cited
UNITED STATES PATENTS

| | | | |
|---|---|---|---|
| 3,042,526 | 7/1962 | Spiess et al. | 99—56 |
| 2,103,153 | 12/1937 | Dunham | 260—9 |

WILLIAM H. SHORT, *Primary Examiner.*

H. SCHAIN, *Assistant Examiner.*